(12) United States Patent
Joret et al.

(10) Patent No.: US 9,211,956 B2
(45) Date of Patent: Dec. 15, 2015

(54) TURBOJET ENGINE NACELLE WITH TRANSLATABLE UPSTREAM COWL

(75) Inventors: Jean-Philippe Joret, Beuzeville (FR); Guy Bernard Vauchel, Harfleur (FR); Denis Guillois, Limours (FR); Stephane Beilliard, Toulouse (FR)

(73) Assignee: AIRCELLE, Gonfreville L'Orcher (FR)

( * ) Notice: Subject to any disclaimer, the term of this patent is extended or adjusted under 35 U.S.C. 154(b) by 1010 days.

(21) Appl. No.: 13/129,290

(22) PCT Filed: Aug. 28, 2009

(86) PCT No.: PCT/FR2009/001038
§ 371 (c)(1),
(2), (4) Date: May 13, 2011

(87) PCT Pub. No.: WO2010/055216
PCT Pub. Date: May 20, 2010

(65) Prior Publication Data
US 2011/0219783 A1    Sep. 15, 2011

(30) Foreign Application Priority Data
Nov. 13, 2008    (FR) ...................................... 08 06318

(51) Int. Cl.
*F02C 7/20*    (2006.01)
*F02C 7/04*    (2006.01)
*B64D 29/08*   (2006.01)

(52) U.S. Cl.
CPC .. *B64D 29/08* (2013.01); *F02C 7/04* (2013.01)

(58) Field of Classification Search
CPC .... B64D 33/02; B64D 2033/0286; F02C 7/04
USPC ................ 60/226.1, 796–798; 244/54, 53 B
See application file for complete search history.

(56) References Cited

U.S. PATENT DOCUMENTS 3,460,762 A *   8/1969   Weise .............................. 60/232
3,820,719 A *   6/1974   Clark ........................... 60/226.2

(Continued)

FOREIGN PATENT DOCUMENTS

EP    1495963 A2    1/2005
FR    2898868 A1    9/2007

(Continued)

OTHER PUBLICATIONS

International Search Report PCT/FR2009/001038; Dated Mar. 10, 2010.

*Primary Examiner* — Ted Kim
(74) *Attorney, Agent, or Firm* — Brinks Gilson & Lione

(57) ABSTRACT

Turbojet engine nacelle (1) comprising an air intake structure (4) able to channel a flow of air towards a fan of the turbojet engine, and a central structure (5) intended to surround said fan and to which the air intake structure is attached in such a way as to ensure aerodynamic continuity, the central structure comprising, on the one hand, a casing intended to surround the fan and, on the other hand, an outer structure, characterized in that the air intake structure comprises a longitudinal outer panel (40) incorporating an air intake lip (4a) and which may extend so far as to incorporate at least part of the outer structure of the central section and beyond, said longitudinal outer panel being translationally mobile between an operating position in which the outer panel ensures the aerodynamic continuity of the outside of the nacelle (1), and a maintenance position in which the outer panel (40) is set away from the outer structure of the central section and the air intake lip (4a) is set away from the inner panel of the air intake structure, characterized in that the longitudinal outer panel (40) is associated with guide means of the rails (15)/slide (16) type, at least part of said guide means being positioned as close as possible to an interface with a pylon (2) to which the nacelle is attached.

13 Claims, 5 Drawing Sheets

(56) References Cited

U.S. PATENT DOCUMENTS

| | | | |
|---|---|---|---|
| 4,206,893 A * | 6/1980 | Howard | 244/54 |
| 4,555,078 A * | 11/1985 | Grognard | 244/54 |
| 4,688,757 A | 8/1987 | Cook | |
| 5,035,379 A | 7/1991 | Hersen | |
| 5,609,313 A | 3/1997 | Cole | |
| 6,340,135 B1 * | 1/2002 | Barton | 244/53 B |
| 6,592,074 B2 * | 7/2003 | Dehu et al. | 244/110 B |
| 2007/0267539 A1 * | 11/2007 | Bulin | 244/53 R |
| 2010/0148012 A1 * | 6/2010 | McDonough et al. | 244/53 B |
| 2010/0252689 A1 * | 10/2010 | Vauchel et al. | 244/53 B |

FOREIGN PATENT DOCUMENTS

| | | |
|---|---|---|
| FR | 2906568 A1 | 4/2008 |
| FR | 2914363 A1 | 10/2008 |

* cited by examiner

TURBOJET ENGINE NACELLE WITH TRANSLATABLE UPSTREAM COWL

TECHNICAL FIELD

The present invention relates to a turbojet engine nacelle comprising an air intake structure able to channel a flow of air towards a fan of the turbojet engine and a central structure intended to surround said fan and to which the air intake structure is attached.

BACKGROUND

An airplane is propelled by one or more propulsion assemblies comprising a turbojet engine housed in a tubular nacelle. Each propulsion assembly is attached to the airplane by a pylon situated generally under a wing or at the fuselage.

A nacelle generally has a structure comprising an air intake upstream of the engine, a central section intended to surround a fan of the turbojet engine, a downstream section housing thrust reverser means and intended to surround the combustion chamber of the turbojet engine, and generally ends with a jet nozzle whereof the outlet is situated downstream of the turbojet engine.

The air intake comprises, on one hand, an air intake lip adapted to allow optimal collection towards the turbojet engine of the air necessary to supply the fan and the internal compressors of the turbojet engine, and on the other hand, a downstream structure on which the lip is attached and intended to channel the air suitably towards the vanes of the fan. The assembly is attached upstream of a case of the fan belonging to the central section of the nacelle.

Depending on the temperature and relative humidity conditions on the ground or in flight, ice may form on the profile of the lip, in particular at the inner profile. This ice formation can be dangerous for the mechanical operation of the stationary and rotating parts of the engine and can cause a decrease in performance. Deicing systems for this part of the air intake lip have therefore been developed to resolve this problem. Examples in particular include documents U.S. Pat. No. 4,688,757 and EP 1 495 963, as well as the application registered under number FR 06/02547.

Currently, maintenance operations on this equipment housed inside the air intake structure require the builders to provide access hatches to the various pieces of equipment. Despite the efforts made to optimize the positioning of the hatches and allow the easiest possible access, it is sometimes necessary to reach the internal equipment of the air intake structure using specific tools, such as an endoscope, which is not fully satisfactory in terms of monitoring this equipment.

Moreover, in the event it is necessary to replace part of the internal equipment, it will be necessary to take out the entire air intake structure, which requires significant tools and causes immobilization of the propulsion assembly and therefore of the airplane in general.

It will also be noted that the conditions for exploitation and maintenance of an air intake require distinct components, such as a sectorized modular lip as well as an easily removable outer panel due to their high replacement rate as a result of their direct exposure to the outside environment and any projectiles. These constraints significantly reduce the integrity of the general aerodynamic line of the air intake structure, which the presence of access hatches further aggravates.

Solutions have been presented in document U.S. Pat. No. 5,609,313 and application FR 06/08599. In order to offset the mentioned drawbacks, these documents provide a turbojet engine nacelle comprising an air intake structure that can be translated forward and thereby at least partially exposing the inside of the nacelle.

Thus, by incorporating the air intake lip into the outer panel so as to form a single disassemblable piece, disassembly and partial replacement of the air intake structure are possible and made easier. Furthermore, the disassembly thus facilitated also makes it possible to open the air intake structure to access internal equipment without demanding substantial and complicated maneuvers or requiring a long immobilization time.

These mobile cowls are generally mounted on a rail/slide system comprising a plurality of rails arranged around the nacelle. Application FR 07/09105 proposes an installation of these rails on the fan case.

However, the number of guide means used makes the nacelle heavier and there is therefore a need to improve such a mobile cowl system requiring fewer guide rails while preserving good integrity of the structure.

Furthermore, the guide structures described in these documents are generally less suited to nacelles arranged at the fuselage of an aircraft and for which the attachment pylon is substantially horizontal.

BRIEF SUMMARY

In order to offset the previously mentioned drawbacks, the present invention relates to a turbojet engine nacelle comprising an air intake structure able to channel a flow of air towards a fan of the turbojet engine, and a central structure intended to surround said fan and to which the air intake structure is attached in such a way as to ensure aerodynamic continuity, the central structure comprising, on one hand, a casing intended to surround the fan and, on the other hand, an outer structure, characterized in that the air intake structure comprises a longitudinal outer panel incorporating an air intake lip and which may extend so far as to incorporate at least part of the outer structure of the central section and beyond, said longitudinal outer panel being translationally mobile between an operating position in which the outer panel ensures the aerodynamic continuity of the outside of the nacelle, and a maintenance position in which is set away from the outer structure of the central section and the air intake lip is set away from the inner panel of the air intake structure, characterized in that the longitudinal outer panel is associated with guide means of the rail/slide type, at least part of said guide means being positioned as close as possible to an interface with a pylon to which the nacelle is attached.

Thus, by providing guide means positioned as close as possible to an interface with an attachment pylon, the reaction and transmission of the stresses to the pylon via the guide means are considerably improved. It follows that it is possible to use fewer guide means, which lightens the nacelle assembly. Furthermore, in the event a pneumatic hose explodes, or in the event of an overpressure inside the nacelle, this better reaction of forces makes it possible to greatly reduce structural distortions in such a case.

Advantageously, the interface of the mobile outer panel with the attachment pylon comprises sealing means. These means can for example be longitudinal joints.

Also advantageously, the sealing means are arranged so as to have a slope releasing the crushing of the joint during opening and closing manipulations of the translatable structure.

According to a first embodiment of the invention, the nacelle comprises at least two guide means of the rail/slide type arranged on either side of the interface with the attachment pylon. These elements being arranged indifferently on the stationary structure or the mobile structure and vice versa.

According to a second embodiment of the invention, the nacelle comprises a single guide means of the rail/slide type associated with at least one centering means.

Advantageously, at least one rail is equipped, at an upstream portion of said rail, with a reinforcing connecting rod intended to be connected to the pylon. Indeed, the upstream portion of the guide means is cantilevered relative to its fastening means, a support connecting rod therefore allows optimal support of this upstream portion.

Also advantageously, the spacing between at least two rails is maintained via at least one fitting arranged between said rails and fastened in each of them.

Preferably, the mobile structure is equipped with centering and positioning means able to cooperate with complementary centering and positioning means of a stationary structure.

Also preferably, the centering and positioning means comprise at least one distortion limiter including at least one fitting mounted on a stationary structure or the mobile structure so as to come between two fittings mounted on the mobile structure or the stationary structure, a space being formed when the mobile structure is in the closed position between the fitting mounted on the stationary (or mobile) structure and the fittings mounted on the mobile (or stationary) structure.

Thus, in the closed position, the fitting mounted on the stationary (or mobile) structure is spaced away from the fittings mounted on the mobile (or stationary) structure, which prevents the transmission of forces, whereas in the open position, under the effect of the wind, for example, and the distortion of the mobile structure, the fitting fastened on the stationary (or mobile) structure bears against one or the other of the fittings mounted on the mobile (or stationary) structure, which allows forces to be reacted and eases all of the structures.

Advantageously, the distortion limiter is arranged opposite the attachment interface to the pylon.

Additionally advantageously, the guide means are associated with additional means for reacting forces, such as shearing pins 18, arranged near the interface of the mobile structure with the pylon, and able to cooperate with additional force reacting means of a stationary element, in particular said pylon.

Such additional means for reacting circumferential forces (shearing pin 18) added in an area close to the guide means make it possible to help said guide means bear any parasitic force during operation. Fittings supporting force reaction axes are mounted in the surroundings of the rails surrounding the pylon close to the opening of the outer cowling. Complementary receiving fittings are mounted opposite each other on the fixed structure of the nacelle or the pylon. It should be noted that the additional means can indifferently be mounted on the stationary structure or the mobile structure and vice versa.

In a complementary manner, at least part of the guide means is contained in a longitudinal enclosure of the central structure.

Also in a complementary manner, at least part of the guide means has an overhang downstream 22 of the rails or slides at an area of a rear section of the nacelle.

According to one preferred embodiment, the nacelle is a nacelle for an aircraft fuselage.

Advantageously, the nacelle is intended to be fastened to a substantially horizontal pylon.

BRIEF DESCRIPTION OF THE DRAWINGS

The present invention will be better understood in light of the following detailed description relative to the appended drawing, in which.

DETAILED DESCRIPTION

Figure 1:
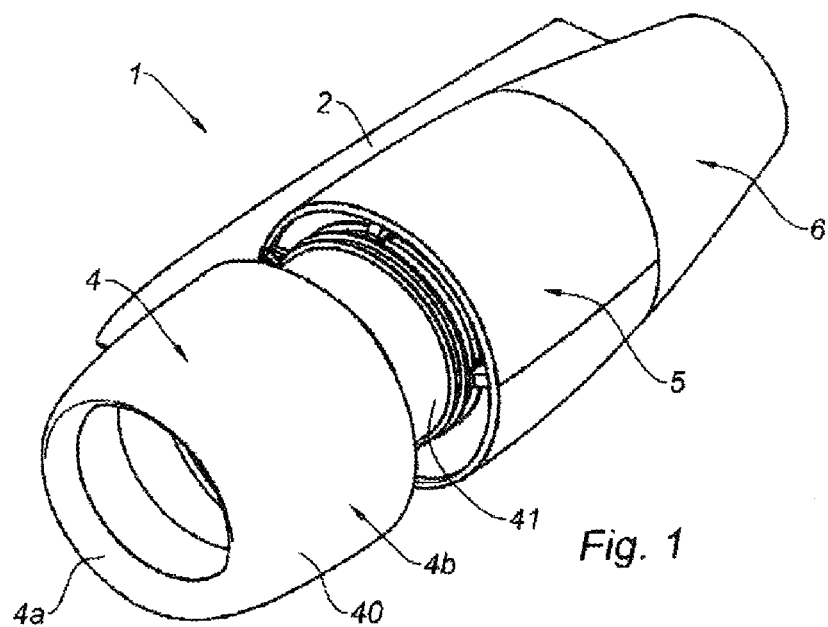
FIG. 1 is a diagrammatic perspective illustration of a nacelle according to the invention.
Figure 2:
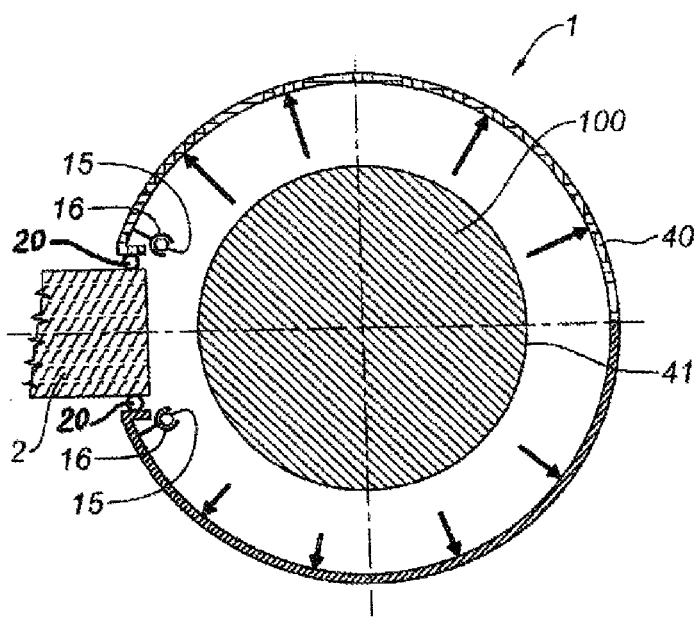
FIG. 2 is a view similar to FIG. 2 in which the rails are arranged according to the invention.
Figure 3:
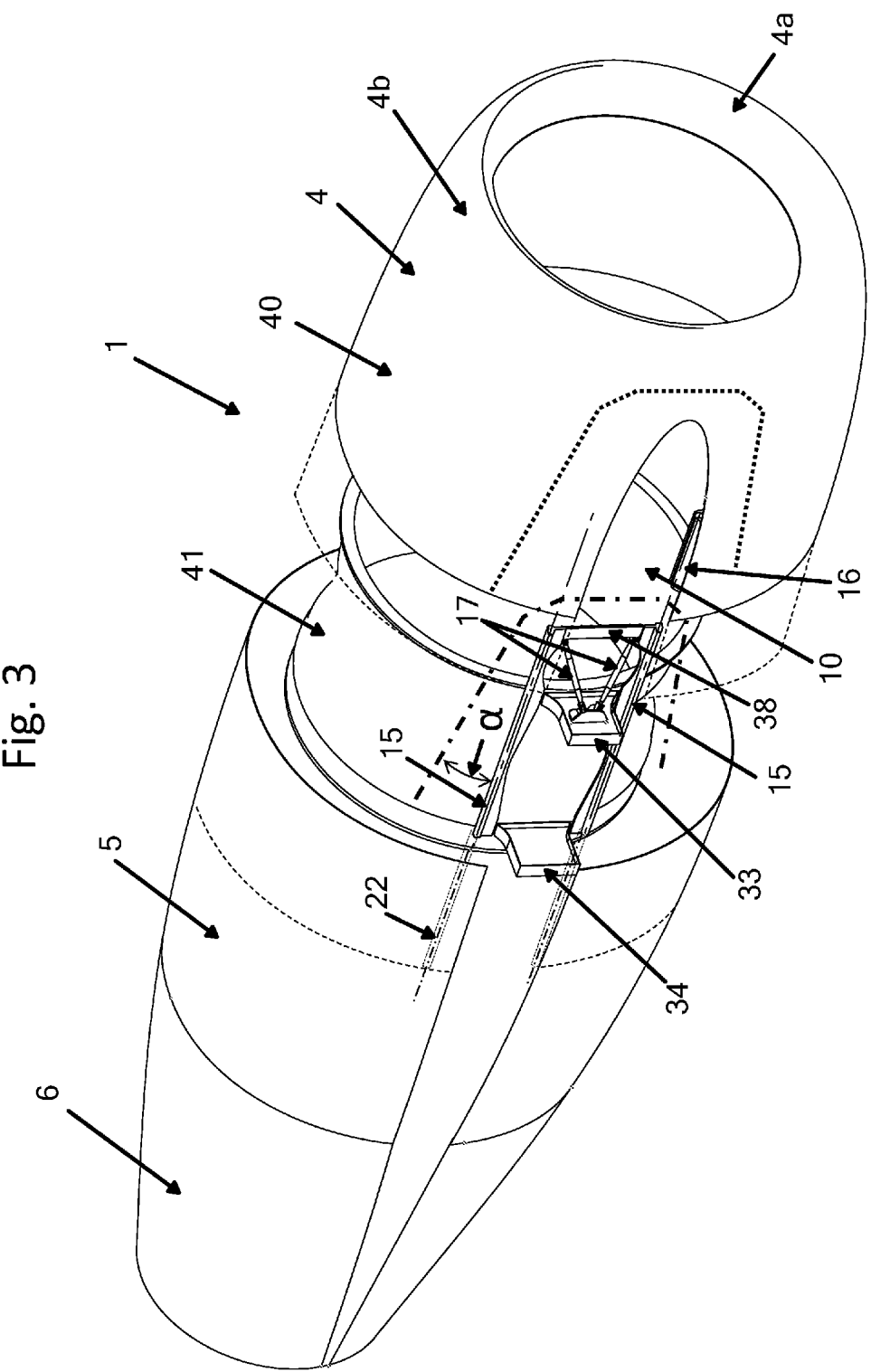
FIG. 3 is a view of the nacelle of FIG. 1 showing a mobile structure in the open position.
Figure 4:
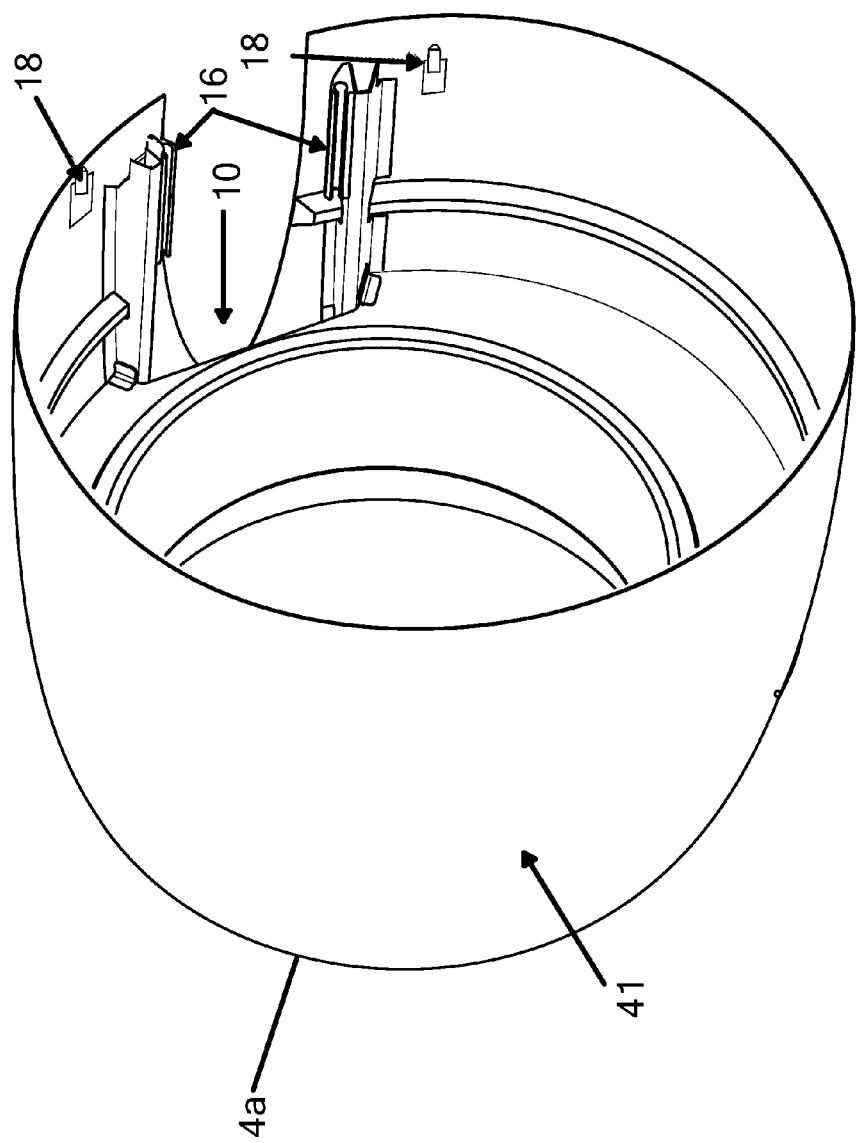
FIG. 4 is an illustration of the mobile structure alone.

A nacelle 1 according to the invention, as shown in FIG. 1, constitutes a tubular housing for a turbojet engine 100 whereof it serves to channel the flows of air that it generates by defining inner and outer aerodynamic lines needed to obtain optimal performance.

More specifically, the nacelle shown in FIG. 1 is intended to equip an airplane of the business or tourism type. The propulsion assemblies of such airplanes are generally fastened at their fuselages via a substantially horizontal pylon 2.

In general, the nacelle 1 has a structure comprising a forward section forming an air intake 4, a central section 5 surrounding a fan and a compressor body (not shown) of the turbojet engine, and a rear section 6 able to house a thrust reverser system.

The air intake 4 is divided into two zones, i.e. on one hand, an air intake lip 4a adapted to allow optimal collection towards the turbojet engine 100 of the air necessary to supply the fan and the internal compressors of the turbojet jet engine, and on the other hand, a downstream structure 4b, comprising an outer panel 40 and an inner panel 41 and on which the lip 4a is fastened.

In a nacelle 1 relative to the present invention, the lip 4a is integrated into the outer panel 40 so as to form a single translatable piece. The inner panel being fastened upstream of a fan casing.

Of course, the inventive nacelle is not limited to the cited embodiment, the single translatable piece in particular being able to extend to comprise at least one portion of an outer panel of the central structure 5, or even to extend to the rear section 6. In another alternative, the inner panel 41 could be integrated into said translatable structure instead of being stationary.

It will be noted that the outer panel of the mobile structure has a cutout 10 bypassing the pylon 2 when said translatable structure is in the closed position and making it possible to accommodate a forward portion of said pylon. This cutout therefore forms an interface with the pylon 2 and can comprise peripheral sealing rings 20.

The interface of the seal 20 with the pylon 2 is advantageously done with a slope "α" releasing the crushing of the seal during the opening and closing manipulation of the structure of the mobile cowl.

The mobile structure is translatably mounted on guide means, i.e. two rail 15/slide 16 systems arranged on either side of the pylon 2, as close as possible to the interface with said pylon 2.

The rails 15 are secured to the pylon 2, or possibly the fan casing, while the slides 16 are secured to the mobile structure. Of course, the opposite arrangement is possible.

More precisely, the rails 15 are fastened to the pylon 2 via a downstream fitting 34 and an upstream fitting 33 intended to be introduced and fastened in the pylon 2.

In this way, the rails 15/slide 16 systems allow better reaction and transmission of forces by the pylon 2 and greatly limit distortions of the structure, in particular in the event of internal overpressure due for example to the explosion of a hose.

Furthermore, the two rails 15 have an upstream portion cantilevered relative to the pylon 2 and therefore not directly supported by it.

In order to resolve this, and to improve the strength of the rails 15 when the mobile cowl 4 is in the maintenance position, the unsupported upstream portion of each rail 15 is connected to the pylon 2 by a connecting rod 17 fastened in the front fitting 33.

Moreover, in order to maintain the spacing of the rails 15 at said unsupported upstream portion, the upstream ends of the rails 15 are connected to each other by a fitting 38 maintaining the same spacing.

Figure 5:
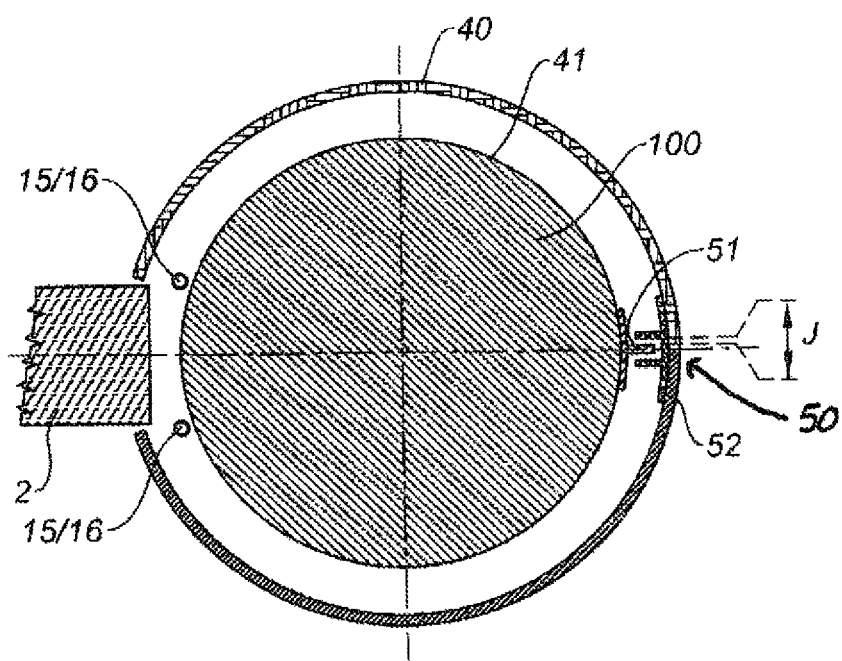
FIG. 5 is a cross-sectional view of the nacelle of FIG. 1 equipped with a distortion limiter.
Figure 6:
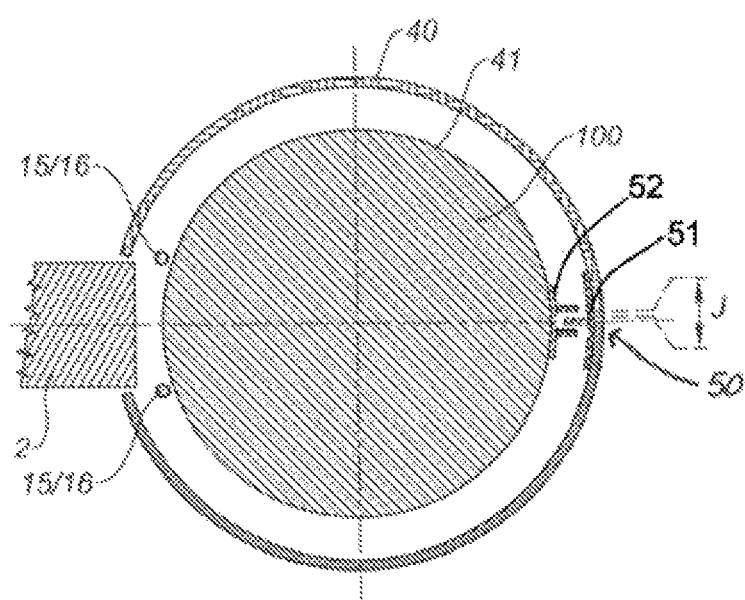
FIG. 6 is a cross-sectional view of the nacelle of FIG. 1 equipped with a distortion limiter in another form of the present disclosure.

The assembly is completed by a distortion limiter 50 as shown in FIG. 5.

This distortion limiter 50 is situated substantially opposite the pylon 2.

It comprises a single fitting 51 fastened on a stationary structure, i.e. the inner panel 41, and a double fitting 52 fastened in the translatable mobile structure so that the single fitting 51 comes between the double fitting 52. Play J is provided, so that the single fitting does not come into contact with the double fitting when the translatable structure is in the closed position. The opposite assembly is also possible, i.e. the fitting 51 mounted on the mobile structure of the cowl and the fitting 52 mounted on the stationary structure.

The distortion limiter 50 also serves as centering means.

In the open position, under the effect of wind or other effects, for example, the single fitting 51 then bears against the double fitting 52, which allows forces to be reacted.

Although the invention has been described with one particular embodiment, it is clearly in no way limited thereto and comprises all technical equivalents of the described means as well as combinations thereof if they are within the scope of the invention.

The invention claimed is:

1. A turbojet engine nacelle comprising:
an air intake structure able to channel a flow of air towards a fan of the turbojet engine; and
a central structure surrounding said fan and to which the air intake structure is attached in such a way as to ensure aerodynamic continuity, the central structure comprising a casing surrounding the fan and an outer structure,
wherein the air intake structure comprises an inner panel and a longitudinal outer panel incorporating an air intake lip, and the longitudinal outer panel extends so far as to incorporate at least part of the outer structure of the central section and beyond, the longitudinal outer panel being translationally mobile between an operating position and a maintenance position, the operation position in which the longitudinal outer panel ensures the aerodynamic continuity of the outside of the nacelle, and the maintenance position in which the longitudinal outer panel is set away from the outer structure of the central section and the air intake lip is set away from the inner panel of the air intake structure, and
wherein the longitudinal outer panel has a cutout bypassing a pylon in the operating position and the cutout forms an interface with the pylon to which the nacelle attached, and the longitudinal outer panel being associated with structural guide means comprising rails and slides, said rails and slides being arranged near the interface, and wherein the longitudinal outer panel is equipped with at least one centering means arranged on an opposite side of the pylon, and a space between at least two rails of the guide means is maintained via at least one fitting arranged between unsupported upstream ends of said at least two rails and fastened in each of said rails the unsupported upstream ends of the rails being cantilevered relative to the pylon so as to be not directly supported by the pylon.

2. The nacelle according to claim 1, wherein the interface with the pylon comprises sealing means.

3. The nacelle according to claim 2, wherein the sealing means are arranged so as to have a slope releasing the crushing of the joint during opening and closing manipulations of the longitudinal outer panel.

4. The nacelle according to claim 1, wherein said at least two rails of the guide means are associated with said at least one centering means.

5. The nacelle according to claim 1, wherein at least one rail is equipped, at an upstream portion of said rail, with a reinforcing connecting rod connected to the pylon.

6. The nacelle according to claim 1, wherein said at least one centering means comprise at least one distortion limiter including at least one fitting mounted on a stationary structure or the longitudinal outer panel so as to come between two fittings mounted on the longitudinal outer panel or the stationary structure, a space being formed when the longitudinal outer panel is in the closed position between the fitting mounted on the stationary structure and the fittings mounted on the longitudinal outer panel.

7. The nacelle according to claim 1, wherein the structural guide means are associated with additional means for reacting forces arranged near the interface, and able to cooperate with additional force reacting means of a stationary element.

8. The nacelle according to claim 7, wherein the additional means for reacting forces are shearing pins and the stationary element is the pylon.

9. The nacelle according to claim 1, wherein at least part of the structural guide means is contained in a longitudinal enclosure of the central structure.

10. The nacelle according to claim 1, wherein at least part of the structural guide means has an overhang downstream of the rails or slides at an area of a rear section of the nacelle.

11. The nacelle according to claim 1, wherein the nacelle is a nacelle for an aircraft fuselage.

12. The nacelle according to claim 1, wherein the nacelle is fastened to a substantially horizontal pylon.

13. The nacelle according to claim 1, wherein said at least one centering means comprise at least one distortion limiter including at least one fitting mounted on a stationary structure or the longitudinal outer panel so as to come between two fittings mounted on the mobile structure or the stationary structure, a space being formed when the longitudinal outer panel is in the closed position between the fitting mounted on the longitudinal outer panel and the fittings mounted on the stationary structure.

* * * * *